(12) United States Patent
Warrier et al.

(10) Patent No.: US 12,118,762 B2
(45) Date of Patent: Oct. 15, 2024

(54) METHOD AND SYSTEM FOR PROVIDING VISUAL EXPLANATIONS FOR IMAGE ANALYTICS DECISIONS

(71) Applicant: HCL Technologies Limited, New Delhi (IN)

(72) Inventors: Harikrishna C Warrier, Bengaluru (IN); Yogesh Gupta, Noida (IN); Dhanyamraju S U M Prasad, Hyderabad (IN)

(73) Assignee: HCL Technologies Limited, New Delhi (IN)

( * ) Notice: Subject to any disclaimer, the term of this patent is extended or adjusted under 35 U.S.C. 154(b) by 413 days.

(21) Appl. No.: 17/694,710

(22) Filed: Mar. 15, 2022

(65) Prior Publication Data

US 2022/0319142 A1 Oct. 6, 2022

(30) Foreign Application Priority Data

Mar. 30, 2021 (IN) .............................. 202111014651

(51) Int. Cl.
*G06V 10/22* (2022.01)
*G06T 5/50* (2006.01)
*G06T 5/70* (2024.01)
*G06T 5/73* (2024.01)

(52) U.S. Cl.
CPC .............. *G06V 10/225* (2022.01); *G06T 5/50* (2013.01); *G06T 5/70* (2024.01); *G06T 5/73* (2024.01)

(58) Field of Classification Search
CPC ........ G06V 10/82; G06V 10/44; G06V 10/42; G06V 10/443; G06T 5/73; G06T 5/70; G06T 5/50
See application file for complete search history.

(56) References Cited

U.S. PATENT DOCUMENTS

| 9,652,846 | B1 * | 5/2017 | Codella | A61B 6/032 |
| 9,779,492 | B1 * | 10/2017 | Garnavi | G06V 40/193 |
| 2018/0211373 | A1 * | 7/2018 | Stoppa | G06T 7/55 |
| 2020/0372625 | A1 * | 11/2020 | Dal Mutto | G06F 18/254 |

FOREIGN PATENT DOCUMENTS

| CN | 111160374 A | 5/2020 |
| WO | 2020014477 A1 | 1/2020 |

OTHER PUBLICATIONS

Hanene Ben Yedder, Ben Cardoen, Ghassan Hamarneh; Deep learning for biomedical image reconstruction: a survey; Aug. 5, 2020, pp. 215-251.

Ge Wang, Jong Chu Ye, Klaus Mueller, Jeffrey A. Fessler, Image Reconstruction is a New Frontier of Machine Learning, May 15, 2018, pp. 1289-1296, vol. 37, Issue: 6, IEEE.

\* cited by examiner

*Primary Examiner* — Shaghayegh Azima
(74) *Attorney, Agent, or Firm* — Kendal M. Sheets

(57) ABSTRACT

The invention relates to method and system for providing visual explanations for image analytics decisions. The method includes extracting a set of local features from each of a plurality of image instances using a deep learning (DL) model; determining a feature list by aggregating the set of local features from each of the plurality of image instances; generating a two-dimensional (2D) pixel map based on the feature list; superimposing the 2D pixel map of aggregated features on each of the plurality of image instances; and providing a visual explanation for an image analytics decision on one or more of the plurality of image instances based on superimposition.

20 Claims, 7 Drawing Sheets

| | | | | |
|---|---|---|---|---|
| Image instances associated with defective image → | Instance 506 | Instance 508 | Instance 510 | Instance 512 |
| Local Important Features 514 → | | | | |
| Identification of Distinctive Attributes / Features using mark-ups 516 → | 506a, 506a, 506a | 508a, 508a, 508a | 510a | 512a |
| Aggregated Explanation (i.e., harmonized global and local explanations) 518 → | 508a, 512a, 506a, 506a (Local Highlights for Instance 506) | | 512a, 506a, 506a, 510a (Local Highlights for Instance 510) | |

FIG. 5

METHOD AND SYSTEM FOR PROVIDING VISUAL EXPLANATIONS FOR IMAGE ANALYTICS DECISIONS

TECHNICAL FIELD

Generally, the invention relates to image processing. More specifically, the invention relates to a method and system for providing visual explanations for image analytics decisions to users.

BACKGROUND

Typically, Artificial Intelligence (AI) models perform predictions and provide decisions. Further, an explainable AI provides ease in understanding image analytics decisions to the humans. Today, various methods are available that explain predictions as well as classifications performed by the AI models. Some of the existing methods may apply global explanations to the AI model in general and uses local-level explanations to focus on isolated model predictions. Further, global methods such as anchors, feature importance, and prototypes are available and used to provide the explanations. Also, local methods like what-if analysis, counterfactuals, accumulated local effects, and the like, are used to explain instance level predictions.

Moreover, the existing methods generate explanations by considering feature importance for the prediction of interest. Features may be either individual pixels or pixel segments. However, the available methods are unable to provide visual indications using mark-ups for the distinctive features, in order to easily explain the image analytic decisions made by the AI models.

Therefore, there is a need to develop a system that may distinguish the distinctive features to provide visual explanations for the AI model predictions.

SUMMARY

In one embodiment, a method of providing visual explanations for image analytics decisions is disclosed. The method may include extracting a set of local features from each of a plurality of image instances using a deep learning (DL) model. It should be noted that the plurality of image instances may be associated with an image of a given class to be analysed, and the image may be classified into the given class based on a set of global features. The method may further include determining a feature list by aggregating the set of local features from each of the plurality of image instances. The method may further include generating a two-dimensional (2D) pixel map based on the feature list. It should be noted that generating the 2D pixel map may include determining pixel characteristics for each of the set of local features from each of the plurality of image instances. The method may further include superimposing the 2D pixel map of aggregated features on each of the plurality of image instances. The method may further include providing a visual explanation for an image analytics decision on one or more of the plurality of image instances based on superimposition. Further, it should be noted that providing the visual explanation may include visually indicating a plurality of mark-ups on the one or more of the plurality of image instances based on a degree of match between each of the one or more of the plurality of image instances and the 2D pixel map.

In another embodiment, a system for providing visual explanations for image analytics decisions is disclosed. The system may include a processor and a memory communicatively coupled to the processor. The memory may store processor-executable instructions, which, on execution, may cause the processor to extract a set of local features from each of a plurality of image instances using a deep learning (DL) model. It should be noted that the plurality of image instances may be associated with an image of a given class to be analysed, and the image may be classified into the given class based on a set of global features. The processor-executable instructions, on execution, may further cause the processor to determine a feature list by aggregating the set of local features from each of the plurality of image instances. The processor-executable instructions, on execution, may further cause the processor to generate a two-dimensional (2D) pixel map based on the feature list. It should be noted that generating the 2D pixel map may include determining pixel characteristics for each of the set of local features from each of the plurality of image instances. The processor-executable instructions, on execution, may further cause the processor to superimpose the 2D pixel map of aggregated features on each of the plurality of image instances. The processor-executable instructions, on execution, may further cause the processor to provide a visual explanation for an image analytics decision on one or more of the plurality of image instances based on superimposition. Further, it should be noted that providing the visual explanation may include visually indicating a plurality of mark-ups on the one or more of the plurality of image instances based on a degree of match between each of the one or more of the plurality of image instances and the 2D pixel map.

In yet another embodiment, a non-transitory computer-readable medium storing computer-executable instruction for providing visual explanations for image analytics decisions is disclosed. The stored instructions, when executed by a processor, may cause the processor to perform operations including extracting a set of local features from each of a plurality of image instances using a deep learning (DL) model. It should be noted that the plurality of image instances may be associated with an image of a given class to be analysed, and the image may be classified into the given class based on a set of global features. The operations may further include determining a feature list by aggregating the set of local features from each of the plurality of image instances. The operations may further include generating a two-dimensional (2D) pixel map based on the feature list. It should be noted that generating the 2D pixel map may include determining pixel characteristics for each of the set of local features from each of the plurality of image instances. The operations may further include superimposing the 2D pixel map of aggregated features on each of the plurality of image instances. The operations may further include providing a visual explanation for an image analytics decision on one or more of the plurality of image instances based on superimposition. Further, it should be noted that providing the visual explanation may include visually indicating a plurality of mark-ups on the one or more of the plurality of image instances based on a degree of match between each of the one or more of the plurality of image instances and the 2D pixel map.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals

FIG. 5 illustrates an exemplary process for providing visual explanations for a defective submersible pump impeller during an inspection of the submersible pump impeller, in accordance with some embodiments of the present disclosure.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
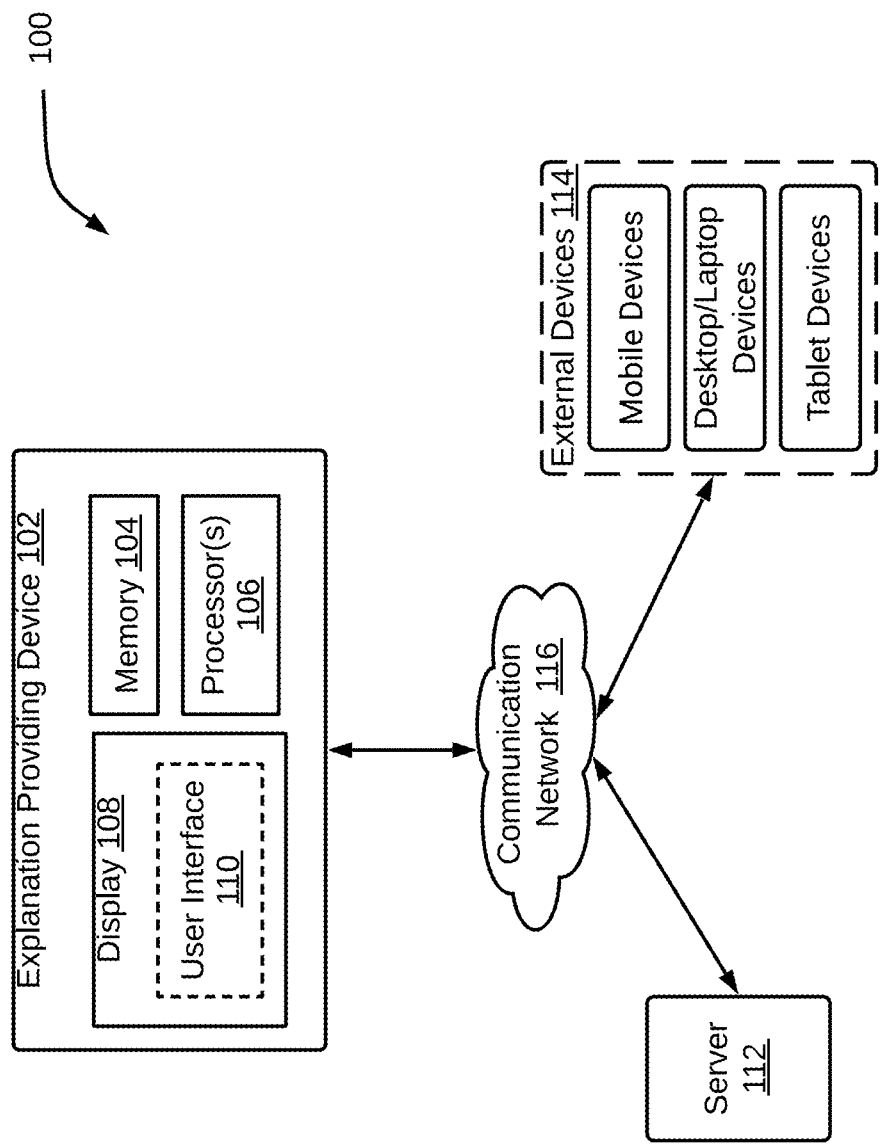
FIG. 1 illustrates a block diagram of an exemplary system in a network environment for providing visual explanations for image analytics decisions, in accordance with some embodiments of the present disclosure.

Referring now to FIG. 1, a block diagram of a system 100 for providing visual explanations for image analytics decisions is illustrated, in accordance with some embodiments of the present disclosure. The system 100 may include an explanation providing device 102. The explanation providing device 102 may holistically explain image analytics decisions. Further, the explanation providing device 102 may harmonize both global as well as local features and provide instance-level explanations, thereby eliminates the aforementioned problems. Examples of the explanation providing device 102 may include, but are not limited to, a server, a desktop, a laptop, a notebook, a tablet, a smartphone, a mobile phone, an application server, or the like.

The explanation providing device 102 may include a memory 104, a processor 106, and a display 108. The display 108 may further include a user interface 110. A user, or an administrator may interact with the explanation providing device 102 and vice versa through the user interface 110. By way of an example, the display 108 may be used to display results of analysis (e.g., for rendering visual explanations for image analytic decisions) performed by the explanation providing device 102, to the user. By way of another example, the user interface 110 may be used by the user to provide inputs (e.g., modified image instances) to the explanation providing device 102. Further, for example, in some embodiments, the explanation providing device 102 may render results to the user/administrator via the user interface 110.

The memory 104 and the processor 106 of the explanation providing device 102 may perform various functions including, but not limited to, feature extraction, feature list determination, Two-Dimensional (2D) map generation, superimposition of 2D pixel map on image instances, and the like. The memory 104 may store instructions that, when executed by the processor 106, cause the processor 106 to provide visual explanations for image analytic decisions automatically, in accordance with some embodiments of the present invention. In accordance with an embodiment, the memory 104 may also store various data (e.g., image instances, local features, global features, feature list, 2D pixel map etc.) that may be captured, processed, generated, and/or required by the explanation providing device 102.

The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

In order to provide the visual explanations, the explanation providing device 102 may acquire information (e.g., local features of a plurality of image instances) from a server 112. Further, the server 112 may include a database (not shown in FIG. 1). The database may store intermediate results generated by the explanation providing device 102.

In some embodiments, the explanation providing device 102 may interact with the user or administrator via external devices 114 over a communication network 116. In such embodiments, the explanation providing device 102 may render the results to the user/administrator via the user interface 110 over the external devices 114. For example, the user or administrator may get generated results over the external devices 114. The one or more external devices 114 may include, but not limited to, a desktop, a laptop, a notebook, a netbook, a tablet, a smartphone, a remote server, a mobile phone, or another computing system/device. The communication network 116 may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

Further, the explanation providing device 102 may interact with the external devices 114 and/or the server 112 for sending/receiving various data, via the communication network 116. In accordance with an embodiment, the server 112 may be communicatively coupled to the database (not shown in FIG. 1), via the communication network 116.

Figure 2:
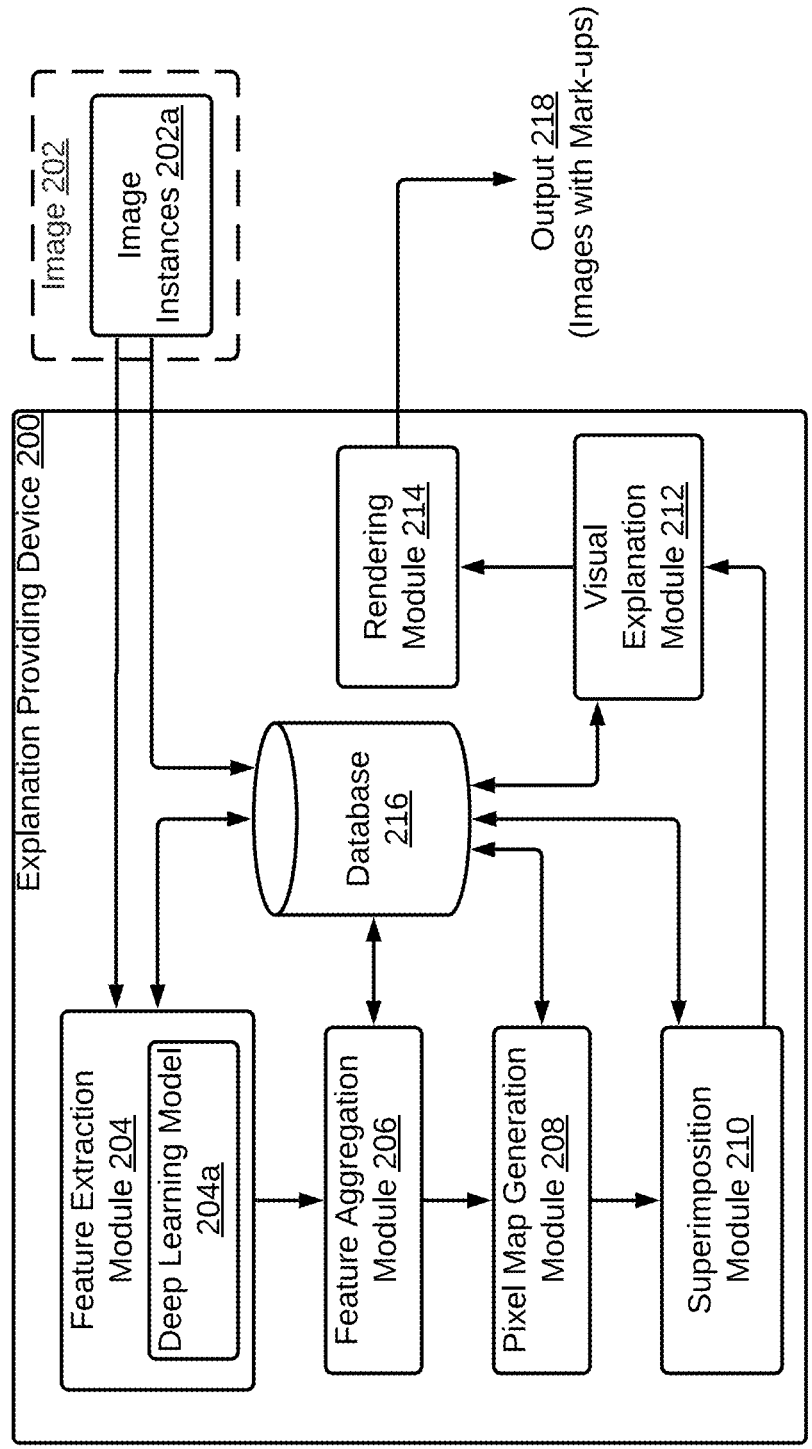
FIG. 2 illustrates a functional block diagram of an exemplary explanation providing device configured to provide a visual explanation for an image analytics decision, in accordance with some embodiments of the present disclosure.

Referring now to FIG. 2, a functional block diagram of an exemplary explanation providing device 200 (analogous to the explanation providing device 102) is illustrated, in accordance with some embodiments of the present disclosure. The explanation providing device 200 may be configured to provide a visual explanation for an image analytics decision. In some embodiments, the explanation providing device 200 may visually explain the image analytics decisions in a mark-up fashion in order to explain how the image analytics decisions are taken. Further, to provide the visual explanation, the explanation providing device 200 may extract all local distinctive characteristics from a plurality of image instances 202a associated with an image 202 of a given class and aggregate them for an instance-based prediction. Further, various user-defined operations may also be performed on the plurality of image instances 202a to explain various hypothetical scenarios for better analysis.

The explanation providing device 200 may perform various functions to provide the visual explanation for the image analytics decision. Further, to perform the functions, the explanation providing device 200 may include a feature extraction module 204, a feature aggregation module 206, a pixel map generation module 208, a superimposition module 210, a visual explanation module 212, and a rendering module 214. Additionally, the explanation providing device 200 may also include a database 216 to store various data and intermediate results generated by the modules 204-214.

The feature extraction module 204 may be configured to extract a set of local features from each of a plurality of image instances 202a. The set of local features represents a local explanation for each of the plurality of image instances 202a. It should be noted that the plurality of image instances 202a may be associated with the image 202 of a given class that is to be analysed. The image 202 may be classified into the given class based on a set of global features. The set of global features represents a global explanation for the image 202. In some embodiments, the feature extraction module 204 may extract a set of local features from modified image instances. A modified image instance may correspond to an image instance modified by performing a user defined operation, such as a sharpness enhancement operation, a noise reduction operation, a contrast modification operation, and the like. Modification of image instances may be further explained in conjunction with FIG. 7.

Further, the feature extraction module 204 may employ a deep learning (DL) model 204a to extract the set of local features. The DL model 204a may be trained based on a dataset that includes a plurality of image instances associated with a plurality of images of the given class. The feature extraction module 204 may be coupled to the feature aggregation module 206 and the database 216. In some embodiments, the feature extraction module 204 may transmit the set of local features to the database 216, where the set of local features may be stored for further use. In some other embodiments, the feature extraction module 204 may transmit the set of local features to the feature aggregation module 206.

The feature aggregation module 206 may be configured to directly receive the set of local features from the feature extraction module 204 and/or the feature aggregation module 206 may obtain the set of local features from the database 216. Further, the feature aggregation module 206 may be configured to determine a feature list based on the set of local features. In particular, the feature aggregation module 206 may aggregate the set of local features from each of the plurality of image instances 202a, to determine the feature list. The feature aggregation module 206 may be communicatively coupled to the pixel map generation module 208 and the database 216.

The pixel map generation module 208 may be configured to receive the feature list. In some, embodiments the feature list may be received from the pixel map generation module 208, directly. In some other embodiments, the pixel map generation module 208 may fetch the feature list from the database 216. Further, the pixel map generation module 208 may generate a two-dimensional (2D) pixel map based on the feature list. In an embodiment, to generate the 2D pixel map, the pixel map generation module 208 may determine pixel characteristics for each of the set of local features from each of the plurality of image instances 202a. Further, the pixel map generation module 208 may be operatively connected to the superimposition module 210. The superimposition module 210 may superimpose the 2D pixel map of aggregated features on each of the plurality of image instances 202a. The superimposition module 210 may be communicatively connected to the visual explanation module 212 and the database 216.

The visual explanation module 212 may be configured to receive the output generated by the superimposition module 210. The visual explanation module 212 may visually indicate a plurality of mark-ups on the one or more of the plurality of image instances 202a. In other words, a plurality of bounded regions may be indicated within the one or more of the plurality of image instances 202a, by the visual explanation module 212. A bounded region within an image instance may indicate at least one feature from the set of local features. It should be noted that the plurality of mark-ups may be indicated by determining a degree of match between each of the one or more of the plurality of image instances 202a and the 2D pixel map. The mark-ups may be indicated to provide the visual explanation to a user.

In some embodiments, the visual explanation module 212 may indicate the mark-ups to provide a new or additional explanation for the modified image instance. The new or additional explanation may be provided based on a degree of match between the modified image instance and the 2D pixel map. The new or the additional visual explanation may include similar features or distinctive features when compared with respect to a corresponding image instance without the modification. Further, the output 218 of the visual explanation module 212 may be rendered to the user through the rendering module 214. The output 218 may be mark-ups on one or more of the plurality of image instances 202a that provide the visual explanation for the image analytics decision.

It should be noted that the explanation providing device 200 may be implemented in programmable hardware devices such as programmable gate arrays, programmable array logic, programmable logic devices, or the like. Alternatively, the explanation providing device 200 may be implemented in software for execution by various types of processors. An identified engine/module of executable code may, for instance, include one or more physical or logical blocks of computer instructions which may, for instance, be organized as a component, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for providing visual explanations for image analytics decisions. For example, the exemplary system 100 and associated explanation providing device 102 may provide the visual explanation for the image analytics decision, by the process discussed herein. In particular, as will be appreciated by those of ordinary skill in the art, control logic and/or automated routines for performing the techniques and steps described herein may be implemented by the system 100 and the associated explanation providing device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Figure 3:
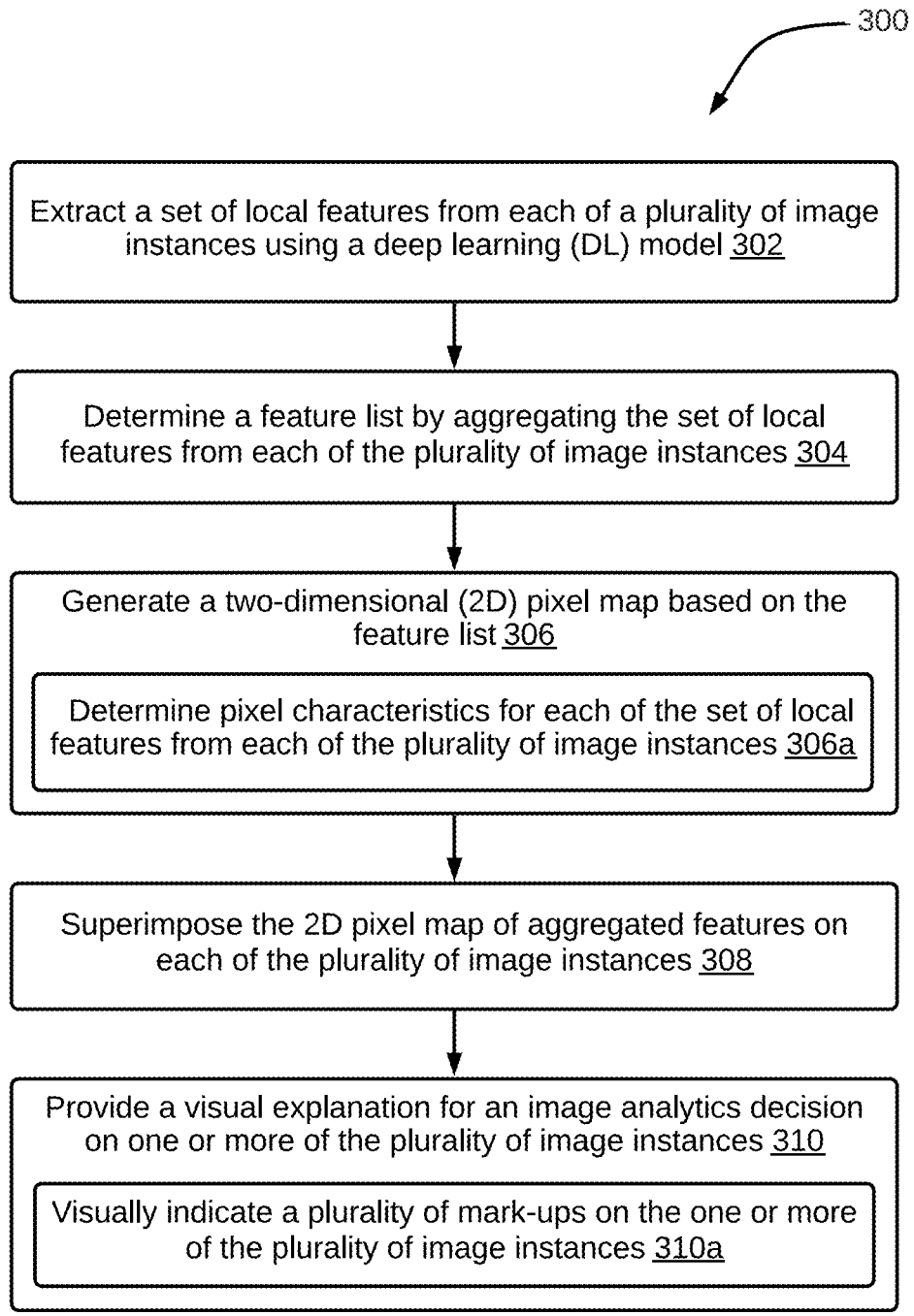
FIG. 3 illustrates a flow diagram of an exemplary process for providing a visual explanation for an image analytics decision, in accordance with some embodiments of the present disclosure.

Referring now to FIG. 3, a flow diagram of an exemplary process 300 for providing a visual explanation for an image analytics decision is depicted, in accordance with some embodiments of the present disclosure. Each step of the process 300 may be performed by an explanation providing device (similar to the explanation providing device 102 and 200).

At step 302, a set of local features may be extracted from each of a plurality of image instances (similar to the image instances 202a). It should be noted that a deep learning (DL) model (similar to the DL model 204a) may be used to extract the set of local features. Further, in some embodiments, the DL model may be trained based on a dataset which includes a plurality of image instances associated with a plurality of images of the given class. The plurality of image instances may be associated with an image (similar to the image 202) of a given class to be analysed. Further, a set of global features may be extracted from the image in order to classify the image into the given class (category). The set of global features may represent a global explanation for the image, while the set of local features may represent a local explanation for each of the plurality of image instances.

At step 304, a feature list may be determined based on the set of local features. In some embodiments, the set of local features from each of the plurality of image instances may be aggregated to determine the feature list. It should be noted that a feature aggregation module (same as the feature aggregation module 206) of the explanation providing device may be used to determine the feature list.

Thereafter, at step 306, a two-dimensional (2D) pixel map may be generated based on the feature list. The 2D pixel map may be generated by using a pixel map generation module (same as the pixel map generation module 208) of the explanation providing device. Further, at step 306a, pixel characteristics may be determined for each of the set of local features from each of the plurality of image instances.

At step 308, the 2D pixel map of aggregated features may be superimposed on each of the plurality of image instances. It should be noted that this step may be performed by a superimposition module (analogous to the superimposition module 210) of the explanation providing device.

Further, at step 310, the visual explanation for the image analytics decision may be provided on one or more of the plurality of image instances based on superimposition. In some embodiments, at step 310a, a plurality of mark-ups may be visually indicated on the one or more of the plurality of image instances to provide the visual explanation. It should be noted that the plurality of mark-ups may be indicated based on a degree of match between each of the one or more of the plurality of image instances and the 2D pixel map. To indicate the plurality of mark-ups, in some embodiments, a plurality of bounded regions may be indicated within the one or more of the plurality of image instances. It should be noted that a bounded region within an image instance may indicate at least one feature from the set of local features.

Figure 4:
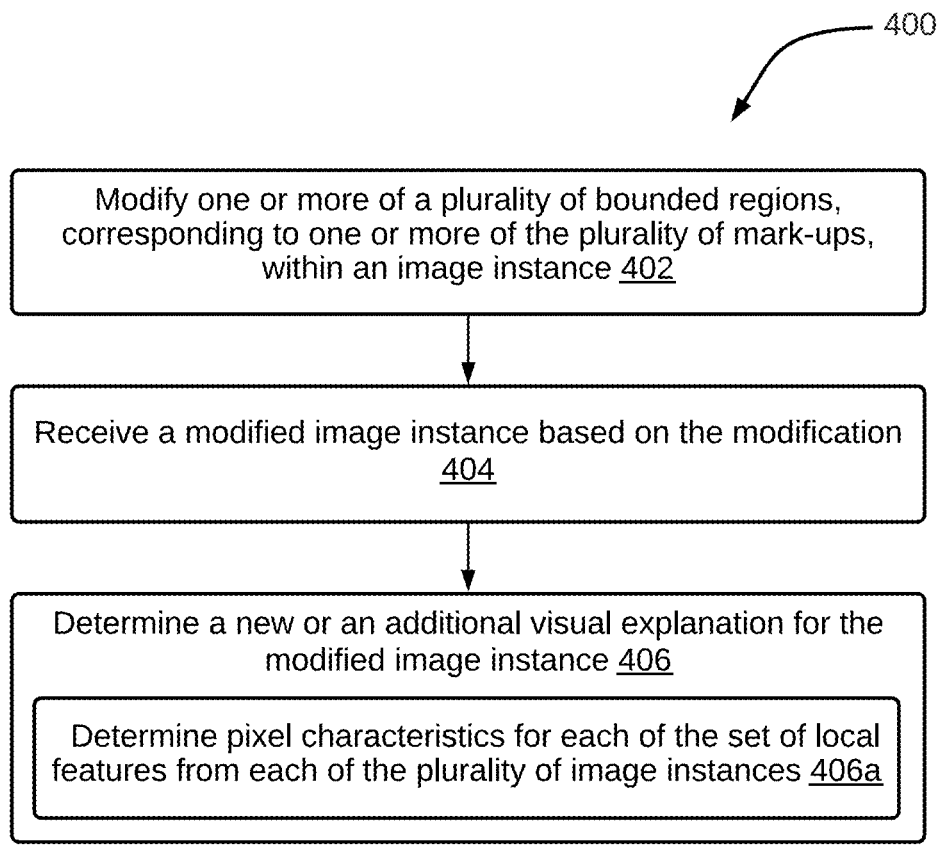
FIG. 4 illustrates a flow diagram of an exemplary process for providing a new or additional visual explanation for a modified image instance, in accordance with some embodiments of the present disclosure.

Referring now to FIG. 4, a flow diagram of an exemplary process 400 for providing a new or additional visual explanation for a modified image instance is depicted, in accordance with some embodiments of the present disclosure.

At step 402, one or more of the plurality of bounded regions may be modified corresponding to one or more of the plurality of mark-ups, within each of the one or more of the plurality of image instances. The modification may be performed to obtain visual explanations for a plurality of hypothetical scenarios. In some embodiments, a plurality of user-defined operations with respect to the bounded region may be performed to modify the one or more of the plurality of bounded regions. For example, the plurality of user-defined operations may include, but is not limited to, a sharpness enhancement operation, a noise reduction operation, a contrast modification operation, a smoothening operation, a region modification operation, and a shape modification operation.

At step 404, a modified image instance based on the modification may be received by the explanation providing device. Thereafter, various similar functions (such as, feature extraction, feature list determination, 2D pixel map generation, and superimposition) may be performed on the modified images instance, as explained in greater detail in FIG. 3 for the plurality of image instances.

Further, at step 406, a new or an additional visual explanation for the modified image instance may be determined. The new or an additional visual explanation may be determined based on a degree of match between the modified image instance and the 2D pixel map. It should be noted that the new or the additional visual explanation may include at least one of similar features or distinctive features when compared with respect to a corresponding image instance without the modification.

Referring now to FIG. 5, an exemplary process 500 for providing visual explanations for a defective submersible pump impeller during an inspection of the submersible pump impeller is illustrated, in accordance with some embodiments of the present disclosure. The process 500 may be performed by an explanation providing device (analogous to the explanation providing device 102 and 200). The process 500 is explained with respect to a non-defective image 502 of the submersible pump impeller and a defective image 504 of the of the submersible pump impeller, as illustrated in FIG. 5. Further, the process 500 may include receiving image instances 506, 508, 510, and 512, associated with the defective image 504 of submersible pump impeller.

In some embodiments, local important features 514 may be extracted from each of the image instances 506, 508, 510, and 512. Further, for each image instance, distinctive attributes 516 may be identified and boundaries may be formed around the distinctive attributes 516 in each image instance. By way of an example, various colors may be used to form the boundaries around the distinctive attributes 516 of the image instances 506, 508, 510, and 512. For example, distinctive attributes of the image instance 506 may be bounded with red color 506a, and distinctive attributes 516 of the image instance 508 with blue color 508a. Similarly, distinctive attributes 516 of the image instances 510 and 512 may be bounded with green and yellow colors 510a and 512a, respectively. In other words, distinctive regions in each image instance may be indicated with mark-ups of different colors. Further, for each aggregated visual explanation 518 (i.e., for harmonized global and local explanation), the distinctive attributes 516 may be taken from aggregated local features across all the other image instances. It should be noted that the visual explanation may not be confined to the local distinct feature alone.

Referring to the harmonized global and local explanation 518 corresponding to the image instance 506, it has a combination of distinctive attributes 516 of its own which are marked in red color 506a (i.e., bounded with red color 506a) along with some of the distinctive attributes 516 of the image instances 508 and 512 which are marked with blue and yellow colors 508a and 512a, respectively.

Now, referring to the harmonized global and local explanation 518 corresponding to the image instance 510, it has a combination of distinctive attributes 516 of its own (marked with green 510a) as well as some of the distinctive attributes of image instances 506 and 512 marked with red color 506a and yellow color 512a, respectively. Thus, by using the explanation providing device, better explanations (harmonized global and local explanations 518) of why the image instances 506 and 510 are classified as defective image instances may be provided.

Figure 6:
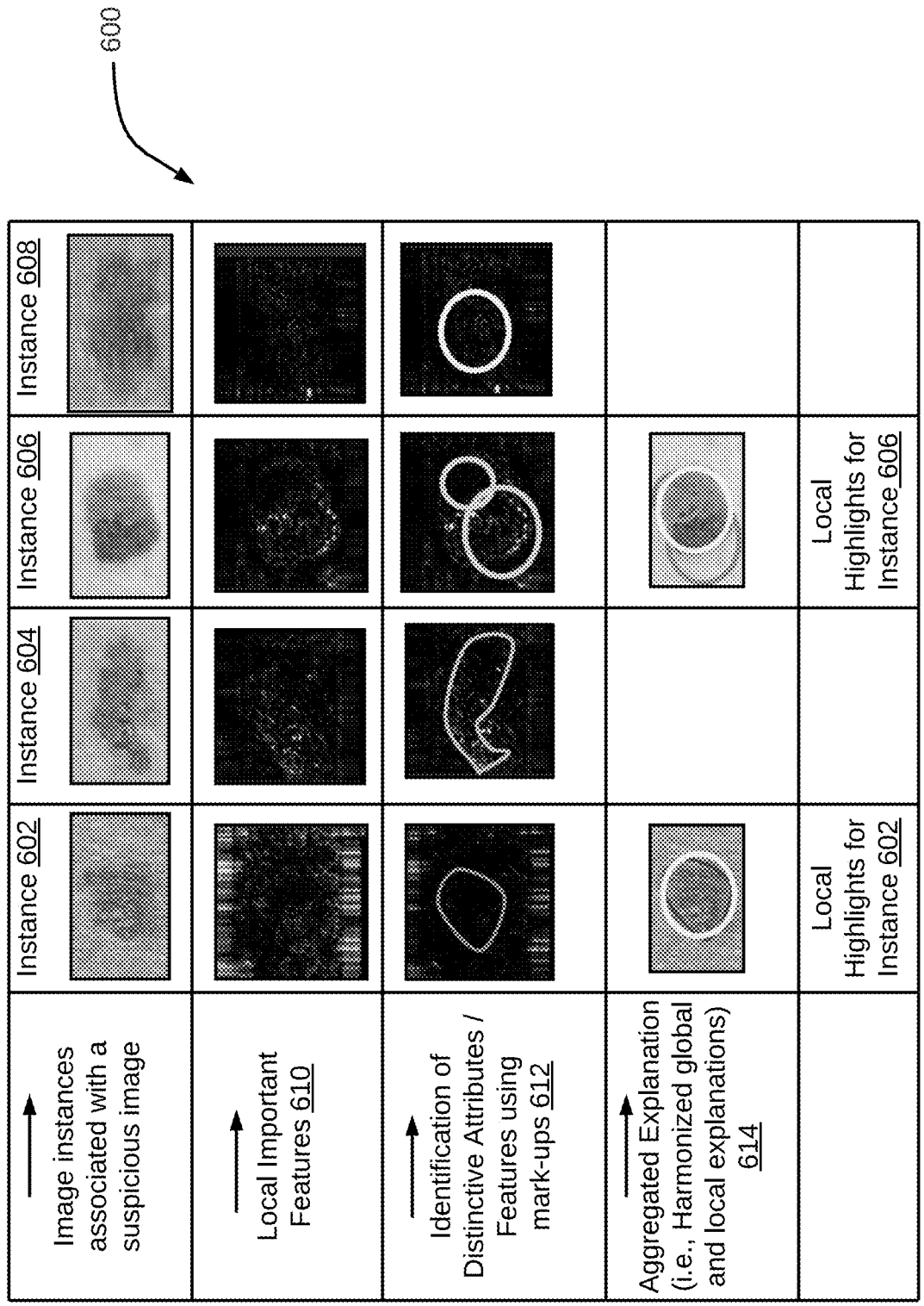
FIG. 6 illustrates an exemplary process for providing visual explanations corresponding to suspicious images of skin tissues, in accordance with some embodiments of the present disclosure.

Referring now to FIG. 6, an exemplary process 600 for providing visual explanations corresponding to suspicious images of skin tissues is illustrated, in accordance with some embodiments of the present disclosure. The process 600 may be performed by an explanation providing device (analogous to the explanation providing device 102 and 200) for providing the visual explanations for the suspicious images of skin tissues. The process 600 may start with receiving image instances 602, 604, 606, and 608 associated with a suspicious image of a skin tissue. Further, the explanation providing device may extract local important features 610 from each of the image instances 602, 604, 606, and 608. Further, for each image instance, the explanation providing device may identify distinctive attributes 612 and indicate the distinctive attributes 612 by mark-ups. As stated above, a first color, a second color, a third color, and a fourth color may be used to form boundaries around the distinctive attributes 612 of the image instances 602, 604, 606, and 608, respectively.

Referring to the harmonized global and local explanation 614 corresponding to the image instance 602, it has a combination of distinctive attributes 612 of its own which may be marked with the first color along with some of the distinctive attributes 612 of the image instance 608 marked with the fourth color. Similarly, referring to the harmonized global and local explanation 614 corresponding to the image instance 606, it has a combination of distinctive attribute 612 of its own marked in the third color along with some of the distinctive attributes of the image instance 608 marked in the fourth color. Thus, by using the explanation providing device, better explanations for classifying the image instances 602 and 608 as suspicious may be provided.

Figure 7:
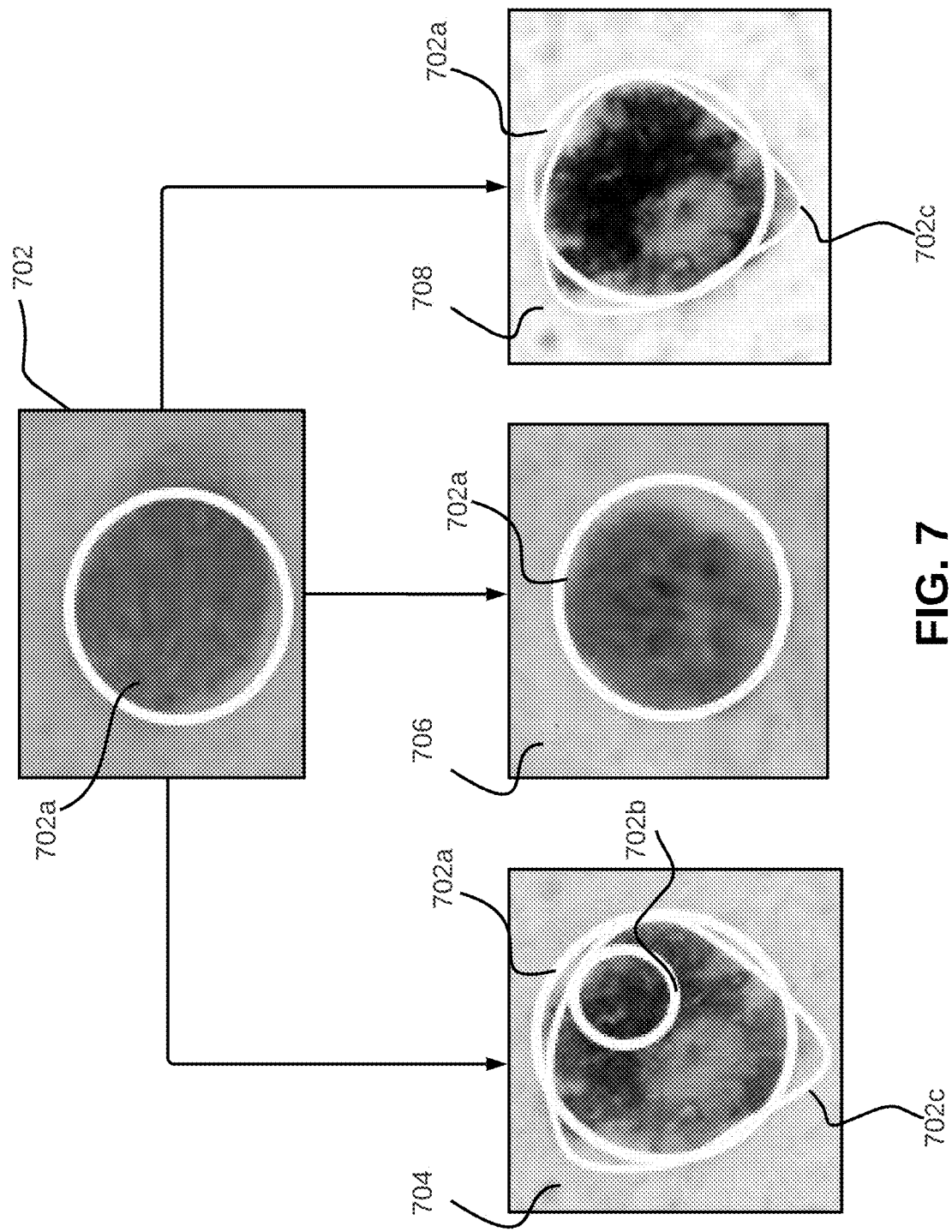
FIG. 7 illustrate generation of modified images from an original image of a skin disease for generating new or additional visual explanations, in accordance with some embodiments of the present disclosure.

Referring now to FIG. 7, generation of modified images 704, 706, 708 from an original image of a skin disease 702 for generating new or additional visual explanations is illustrated, in accordance with some embodiments of the present invention. To obtain the visual explanations for a plurality of hypothetical scenarios, the original image of a skin disease 702 may be modified. Further, when the modified images 704, 706, 708 are processed through an explanation providing device (analogous to the explanation providing device 102 and 200), a new or an additional visual explanation for the modified images 704, 706, 708 may be seen. The new or the additional visual explanation may include at least one of similar features or distinctive features when compared with respect to a corresponding image without the modification.

The modified images 704, 706, and 708 may be obtained by performing various user-defined operations with respect to bounded region 702a within the original image of the skin disease 702. The user-defined operations may include, but are not limited to, a sharpness enhancement operation, a noise reduction operation, a contrast modification operation, a smoothening operation, a region modification operation, and a shape modification operation. In the original image of a skin disease 702, the bounded region 702a with one color is indicating the a suspicious tissue, however other features (bounded with other colors) may not be obvious. Therefore, modification in the original image of the skin disease 702 may help in providing better visual explanations.

In some embodiments, the sharpness enhancement operation may be performed to obtain the modified image 704. By sharpening the bounded region 702a, there may be one more additional feature information within bounded regions 702b and 702c is detected by the explanation providing device, which further strengthens the fact that the tissue is suspicious.

Further, in some other embodiments, the smoothening operation and the contrast modification operation may be performed to obtain the modified images 706 and 708, respectively. It should be noted that the modified image 706 may not provide any additional explanation since the distinctive features has not changed. So, in this particular case, this operation has not yielded any additional information. Further, in the modified image 708, by changing the contrast of the feature (within the bounded region 702a), it is visible that an additional feature information within the bounded region 702c has been detected by the explanation providing device, and now there is a stronger correlation that the original tissue is suspicious.

Thus, the present disclosure may overcome drawbacks of traditional systems discussed before. The disclosed method and system in the present disclosure may harmonize both the global and local explanations and visually explain the functioning of the deep learning model, thereby helps in providing accurate, and easily understandable explanations for image analytic decisions. Further, the disclosed system is able to explain various hypothetical scenarios, where the users may perform modifications based on their choice, and visually check the difference in decisions provided by the deep learning model upon modification. Therefore, the system provides better explanations for model predictions. Additionally, the system has ability to discern the distinctive features and explain how the decisions are taken which is extremely important for building trust and transparency in machine learning.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method of providing visual explanations for image analytics decisions, the method comprising:
    extracting, by an explanation providing device, a set of local features from each of a plurality of image instances using a deep learning (DL) model, wherein the plurality of image instances is associated with an image of a given class to be analysed, and wherein the image is classified into the given class based on a set of global features;
    determining, by the explanation providing device, a feature list by aggregating the set of local features from each of the plurality of image instances;
    generating, by the explanation providing device, a two-dimensional (2D) pixel map based on the feature list, and wherein generating the 2D pixel map comprises determining pixel characteristics for each of the set of local features from each of the plurality of image instances;
    superimposing, by the explanation providing device, the 2D pixel map of aggregated features on each of the plurality of image instances; and
    providing, by the explanation providing device, a visual explanation for an image analytics decision on one or more of the plurality of image instances based on superimposition, wherein providing the visual explanation comprises visually indicating a plurality of mark-ups on the one or more of the plurality of image instances based on a degree of match between each of the one or more of the plurality of image instances and the 2D pixel map.

2. The method of claim 1, wherein the DL model is trained based on a dataset comprising a plurality of image instances associated with a plurality of images of the given class.

3. The method of claim 1, wherein the set of global features represents a global explanation for the image, and wherein the set of local features represents a local explanation for each of the plurality of image instances.

4. The method of claim 1, wherein visually indicating the plurality of mark-ups comprises indicating a plurality of bounded regions within the one or more of the plurality of image instances, and wherein a bounded region within an image instance indicates at least one feature from the set of local features.

5. The method of claim 1, further comprising modifying one or more of a plurality of bounded regions, corresponding to one or more of the plurality of mark-ups, within each of the one or more of the plurality of image instances to obtain visual explanations for a plurality of hypothetical scenarios.

6. The method of claim 5, wherein modifying a bounded region comprises performing a plurality of user-defined operations with respect to the bounded region, wherein the plurality of user-defined operations comprises at least one of a sharpness enhancement operation, a noise reduction operation, a contrast modification operation, a smoothening operation, a region modification operation, and a shape modification operation.

7. The method of claim 5, further comprising:
    receiving, by the explanation providing device, a modified image instance based on the modification; and
    determining, by the explanation providing device, a new or an additional visual explanation for the modified image instance based on a degree of match between the modified image instance and the 2D pixel map, wherein the new or the additional visual explanation comprises at least one of similar features or distinctive features when compared with respect to a corresponding image instance without the modification.

8. A system for providing visual explanations for image analytics decisions, the system comprising:
    a processor; and
    a memory communicatively coupled to the processor, wherein the memory stores processor-executable instructions, which, on execution, cause the processor to:
    extract a set of local features from each of a plurality of image instances using a deep learning (DL) model, wherein the plurality of image instances is associated with an image of a given class to be analysed, and wherein the image is classified into the given class based on a set of global features;
    determine a feature list by aggregating the set of local features from each of the plurality of image instances;
    generate a two-dimensional (2D) pixel map based on the feature list, and wherein generating the 2D pixel map comprises determining pixel characteristics for each of the set of local features from each of the plurality of image instances;
    superimpose the 2D pixel map of aggregated features on each of the plurality of image instances; and
    provide a visual explanation for an image analytics decision on one or more of the plurality of image instances based on superimposition, wherein providing the visual explanation comprises visually indicating a plurality of mark-ups on the one or more of the plurality of image instances based on a degree of match between each of the one or more of the plurality of image instances and the 2D pixel map.

9. The system of claim 8, wherein the DL model is trained based on a dataset comprising a plurality of image instances associated with a plurality of images of the given class.

10. The system of claim 8, wherein the set of global features represents a global explanation for the image, and wherein the set of local features represents a local explanation for each of the plurality of image instances.

11. The system of claim 8, wherein the processor-executable instructions, on execution, cause the processor to visually indicate the plurality of mark-ups by indicating a plurality of bounded regions within the one or more of the plurality of image instances, and wherein a bounded region within an image instance indicates at least one feature from the set of local features.

12. The system of claim 8, wherein the processor-executable instructions, on execution, further cause the processor to modify one or more of a plurality of bounded regions, corresponding to one or more of the plurality of mark-ups, within each of the one or more of the plurality of image instances to obtain visual explanations for a plurality of hypothetical scenarios.

13. The system of claim 12, wherein the processor-executable instructions, on execution, cause the processor to modify a bounded region by performing a plurality of user-defined operations with respect to the bounded region, wherein the plurality of user-defined operations comprises at least one of a sharpness enhancement operation, a noise reduction operation, a contrast modification operation, a smoothening operation, a region modification operation, and a shape modification operation.

14. The system of claim 12, wherein the processor-executable instructions, on execution, further cause the processor to:
receive a modified image instance based on the modification; and
determine a new or an additional visual explanation for the modified image instance based on a degree of match between the modified image instance and the 2D pixel map, wherein the new or the additional visual explanation comprises at least one of similar features or distinctive features when compared with respect to a corresponding image instance without the modification.

15. A non-transitory computer-readable medium storing computer-executable instructions for providing visual explanations for image analytics decisions, the computer-executable instructions configured for:
extracting a set of local features from each of a plurality of image instances using a deep learning (DL) model, wherein the plurality of image instances is associated with an image of a given class to be analysed, and wherein the image is classified into the given class based on a set of global features;
determining a feature list by aggregating the set of local features from each of the plurality of image instances;
generating a two-dimensional (2D) pixel map based on the feature list, and wherein generating the 2D pixel map comprises determining pixel characteristics for each of the set of local features from each of the plurality of image instances;
superimposing the 2D pixel map of aggregated features on each of the plurality of image instances; and
providing a visual explanation for an image analytics decision on one or more of the plurality of image instances based on superimposition, wherein providing the visual explanation comprises visually indicating a plurality of mark-ups on the one or more of the plurality of image instances based on a degree of match between each of the one or more of the plurality of image instances and the 2D pixel map.

16. The non-transitory computer-readable medium of the claim 15, wherein, at least one of:
the DL model is trained based on a dataset comprising a plurality of image instances associated with a plurality of images of the given class; and
the set of global features represents a global explanation for the image, and the set of local features represents a local explanation for each of the plurality of image instances.

17. The non-transitory computer-readable medium of the claim 15, wherein the computer-executable instructions are configured to visually indicate the plurality of mark-ups by indicating a plurality of bounded regions within the one or more of the plurality of image instances, and wherein a bounded region within an image instance indicates at least one feature from the set of local features.

18. The non-transitory computer-readable medium of the claim 15, wherein the computer-executable instructions are further configured to modify one or more of a plurality of bounded regions, corresponding to one or more of the plurality of mark-ups, within each of the one or more of the plurality of image instances to obtain visual explanations for a plurality of hypothetical scenarios.

19. The non-transitory computer-readable medium of the claim 18, wherein the computer-executable instructions are configured to modify a bounded region by performing a plurality of user-defined operations with respect to the bounded region, wherein the plurality of user-defined operations comprises at least one of a sharpness enhancement operation, a noise reduction operation, a contrast modification operation, a smoothening operation, a region modification operation, and a shape modification operation.

20. The non-transitory computer-readable medium of the claim 18, wherein the computer-executable instructions are further configured to:
receive a modified image instance based on the modification; and
determine a new or an additional visual explanation for the modified image instance based on a degree of match between the modified image instance and the 2D pixel map, wherein the new or the additional visual explanation comprises at least one of similar features or distinctive features when compared with respect to a corresponding image instance without the modification.

* * * * *